(12) United States Patent
Park et al.

(10) Patent No.: US 10,592,017 B2
(45) Date of Patent: Mar. 17, 2020

(54) WINDOW DECO FILM AND METHOD OF FABRICATING THE SAME

(71) Applicant: DONGWOO FINE-CHEM CO., LTD., Jeollabuk-do (KR)

(72) Inventors: Ki Joon Park, Gyeonggi-do (KR); Cheol Hun Lee, Gyeonggi-do (KR); Gwang Yong Tak, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 107 days.

(21) Appl. No.: 15/700,771

(22) Filed: Sep. 11, 2017

(65) Prior Publication Data
US 2018/0074611 A1 Mar. 15, 2018

(30) Foreign Application Priority Data
Sep. 13, 2016 (KR) .................. 10-2016-0117873

(51) Int. Cl.
| | |
|---|---|
| *G06F 3/041* | (2006.01) |
| *B32B 17/10* | (2006.01) |
| *B32B 7/12* | (2006.01) |
| *B44C 3/02* | (2006.01) |
| *B44C 1/10* | (2006.01) |

(Continued)

(52) U.S. Cl.
CPC ............... *G06F 3/041* (2013.01); *B32B 7/12* (2013.01); *B32B 17/06* (2013.01); *B32B 17/10* (2013.01); *B32B 23/04* (2013.01); *B32B 27/06* (2013.01); *B32B 27/28* (2013.01); *B32B 27/281* (2013.01); *B32B 27/285* (2013.01); *B32B 27/286* (2013.01); *B32B 27/308* (2013.01); *B32B 27/36* (2013.01); *B32B 27/365* (2013.01); *B44C 1/10* (2013.01); *B44C 3/02* (2013.01); *B32B 2250/02* (2013.01); *B32B 2255/205* (2013.01); *B32B 2255/26* (2013.01); *B32B 2255/28* (2013.01); *B32B 2307/306* (2013.01); *B32B 2307/402* (2013.01); *B32B 2307/546* (2013.01); *B32B 2307/71* (2013.01); *B32B 2367/00* (2013.01); *B32B 2457/20* (2013.01); *B32B 2457/202* (2013.01); *B32B 2457/204* (2013.01);

(Continued)

(58) Field of Classification Search
CPC combination set(s) only.
See application file for complete search history.

(56) References Cited

U.S. PATENT DOCUMENTS

| | | | |
|---|---|---|---|
| 2014/0367242 A1* | 12/2014 | Chen .................. | H03K 17/9622 200/600 |
| 2017/0098796 A1* | 4/2017 | Yee ........................ | H01L 51/524 |
| 2018/0319127 A1* | 11/2018 | Katami .................... | B32B 7/02 |

FOREIGN PATENT DOCUMENTS

KR 10-1277727 B1 6/2013

* cited by examiner

*Primary Examiner* — Deeprose Subedi
(74) *Attorney, Agent, or Firm* — The PL Law Group, PLLC (57) ABSTRACT

A window deco film includes a hard coating layer, and a deco layer, a light-shielding layer and an acryl-based coating layer formed on the hard coating layer. The window deco film may have a remarkably reduced thickness, and thus an entire thickness of an image display device including a window substrate to which the window deco film is applied may be also reduced. Additionally, even when the window deco film is attached to a curved window substrate, a bubble may not be generated at a curved portion of the window substrate. A mura caused by a retardation or a phase difference due to the window deco film may be suppressed. Thus, the window deco film may have an improved transmittance.

9 Claims, 3 Drawing Sheets

(51) Int. Cl.
*B32B 17/06* (2006.01)
*B32B 27/28* (2006.01)
*B32B 27/06* (2006.01)
*B32B 27/36* (2006.01)
*B32B 27/30* (2006.01)
*B32B 23/04* (2006.01)

(52) U.S. Cl.
CPC .............. *G06F 2203/04103* (2013.01); *G06F 2203/04107* (2013.01)

WINDOW DECO FILM AND METHOD OF FABRICATING THE SAME

CROSS-REFERENCE TO RELATED APPLICATION AND CLAIM OF PRIORITY

This application claims priority to Korean Patent Applications No. 10-2016-0117873 filed on Sep. 13, 2016 in the Korean Intellectual Property Office (KIPO), the entire disclosure of which is incorporated by reference herein.

BACKGROUND

1. Field

The present invention relates to a window deco film and a method of fabricating the same.

2. Description of the Related Art

In an image display device such as an liquid crystal display (LCD) device or an organic light emitting diode (OLED) device, a window substrate may be disposed at an outside of the image display device for protecting a display panel. Recently, a touch screen or a touch panel is also employed in the image display device to implement an information input or an information processing.

In the window substrate, a deco film including a company logo or a button printed thereon may be adhered through an optical clear adhesive (OCA).

The deco film may include, e.g., a PET base film, a deco layer, a light-shielding layer, etc. The PET film normally has a large thickness in range from 50 μm to 100 μm, and thus a thickness of the deco film may be also excessively increased. Further, the PET film may cause a phase difference to result in a mura when being employed in the display panel Additionally, when the deco film is attached to a curved window substrate which has been widely used, a bubble may be generated at a curved portion of the window substrate.

Accordingly, a deco film having a sufficient strength while reducing or avoiding the above-mentioned problems is needed.

For example, Korean Registered Patent Publication No. 10-1277727 discloses a touch window deco film and a method of fabricating the same.

SUMMARY

According to an aspect of the present invention, there is provided a window deco film which may have a thin-layered and light-weighted structure and may not be involved with a PET base film.

According to an aspect of the present invention, there is provided a window deco film having enhanced optical properties.

According to an aspect of the present invention, there is provided a method of fabricating the window deco film.

One or more of the above aspects of the present inventive concepts will be achieved by one or more of the following features or characteristics:

(1) A window deco film, comprising: a hard coating layer; and a deco layer, a light-shielding layer and an acryl-based coating layer formed on the hard coating layer.

(2) The window deco film according to the above (1), wherein the window deco film is a substrate-less film.

(3) The window deco film according to the above (1), further comprising a hairline layer.

(4) The window deco film according to the above (3), wherein the hairline layer, the deco layer and the light-shielding layer are sequentially stacked from the hard coating layer.

(5) The window deco film according to the above (1), wherein the acryl-based coating layer is disposed between the hard coating layer and the deco layer, or on the light-shielding layer.

(6) The window deco film according to the above (1), further comprising a first adhesive layer formed on one surface of the hard coating layer, wherein the deco layer, the light-shielding layer and the acryl-based coating layer are stacked on an opposite surface of the hard coating layer with respect to the one surface of the hard coating layer.

(7) The window deco film according to the above (6), further comprising a window substrate attached to the hard coating layer through the first adhesive layer, the window substrate including a display region and a non-display region around the display region.

(8) The window deco film according to the above (7), wherein the deco layer, the light-shielding layer and the acryl-based coating layer are disposed at the non-display region.

(9) The window deco film according to the above (1), further comprising a second adhesive layer, wherein the deco layer, the light-shielding layer and the acryl-based coating layer form a stacked structure, and the second adhesive layer is formed on the stacked structure and the hard coating layer.

(10) The window deco film according to the above (9), further comprising a touch panel attached to the second adhesive layer.

(11) A window comprising the window deco film according to any one of the above (1)-(10).

(12) An image display device comprising the window according to the above (11).

(13) A method of fabricating a window deco film, comprising: forming a hard coating layer; forming a deco layer on the hard coating layer; forming a light-shielding layer on the deco layer; and forming an acryl-based coating layer on the hard coating layer before forming the deco layer, or on the light-shielding layer.

(14) The method according to the above (13), further comprising forming a first adhesive layer on the hard coating layer.

(15) The method according to the above (14), wherein the first adhesive layer is formed on one surface of the hard coating layer, and the deco layer, the light-shielding layer and the acryl-based coating layer are formed on an opposite surface with respect to the one surface of the hard coating layer.

(16) The method according to the above (15), further comprising combining a window substrate with the one surface of the hard coating layer by the first adhesive layer (17) The method according to the above (13), further comprising forming a hairline layer on the hard coating layer before forming the deco layer.

(18) The method according to the above (13), wherein the acryl-based coating layer is formed on the light-shielding layer, further comprising forming a second adhesive layer on the hard coating layer to fill a step portion between the hard-coating layer and the acryl-based coating layer.

(19) The method according to claim 18, further comprising attaching a touch panel to the second adhesive layer.

The window deco film according to example embodiments as described above may have a remarkably reduced thickness, and thus an entire thickness of an image display device including a window substrate to which the window deco film is applied may be also reduced.

Additionally, even when the window deco film is attached to a curved window substrate, a bubble may not be generated at a curved portion of the window substrate.

In the window deco film according to example embodiments, a mura caused by a retardation or a phase difference due to the window deco film may be suppressed. Thus, the window deco film may have an improved transmittance.

DETAILED DESCRIPTION

In the drawings, the thickness of layers, films, panels, regions, etc., are exaggerated for clarity. Also, in the drawings, the thickness of some layers and regions are exaggerated for the sake of brevity. It will be understood that when an element such as a layer, film, region, or substrate is referred to as being "on" another element, it can be directly on the other element or intervening elements may also be present.

The size and thickness of each element are arbitrarily shown in the drawings, and the present invention is not necessarily limited thereto.

According to example embodiments of the present inventive concepts, a window deco film includes a hard coating layer, a deco layer, a light-shielding layer and an acryl-based coating layer is provided. The window deco film may be applied to a window substrate so that an entire thickness of an image display device may be remarkably reduced. The window deco film may be attached to a curved window substrate without generating a bubble at a curved portion of the window substrate, and may have improved optical properties. According to example embodiments of the present inventive concepts, a method of fabricating the window deco film is also provided.

Hereinafter, some exemplary embodiments of the present inventive concepts will be provided with accompanying drawings. However, these embodiments are only given for illustrating the present inventive concepts, and are not to be construed as limiting the scope of the present invention.

Figure 1:
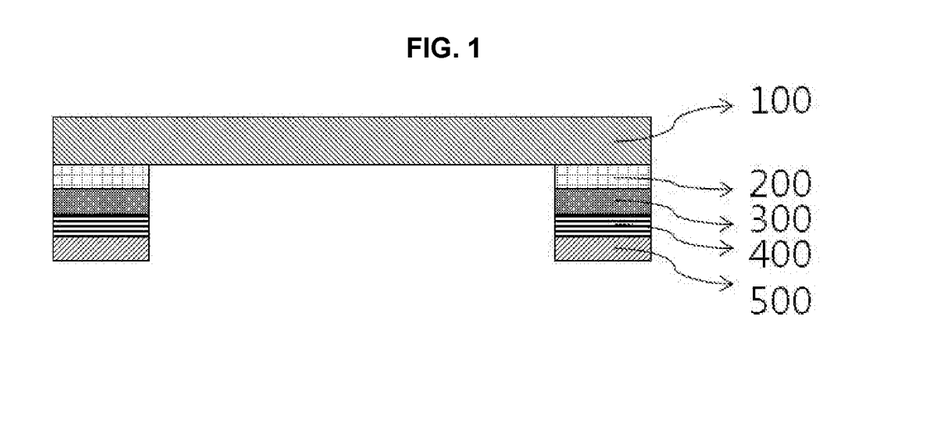
FIGS. 1 and 2 are schematic cross-sectional views illustrating window deco films in accordance with example embodiments of the present inventive concepts.
Figure 2:
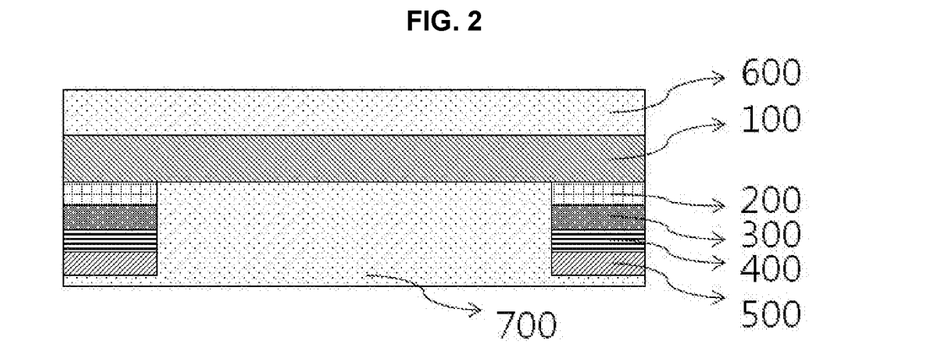

FIGS. 1 and 2 are schematic cross-sectional views illustrating window deco films in accordance with example embodiments of the present inventive concepts.

Referring to FIG. 1, the window deco film may include a hard coating layer 100, a deco layer 300, a light-shielding layer 400 and an acryl-based coating layer 500.

In example embodiments, the hard coating layer 100 may serve as a base layer instead of an individual or additional substrate film.

In a conventional window deco film, a resin film such as a PET film may be included as the substrate film for providing a substrate on which a deco film is formed. The substrate film normally has a thickness of about 50 μm to about 100 μm, and a thickness of the window deco film increases due to the substrate film. As the thickness of the window deco film increases, bubbles may be generated when the window deco film is attached to a curved window substrate.

Further, the resin film such as the PET film may cause a retardation or a phase difference to cause a mura in a display device to which the window deco film is applied.

However, the window deco film according to the present inventive concepts may not include the substrate film, and may be a substantially substrate-less film. As described above, the hard coating layer 100 may substantially serve as the base layer. Therefore, the window deco film may become thinner and lighter so that the bubbles and the retardation may be prevented. Further, a transmittance of the window deco film may be also enhanced.

The hard coating layer 100 may have a sufficient surface hardness to serve as the base layer. For example, the surface hardness of the hard coating layer 100 may be 2H or more.

The hard coating layer 100 may include any material for implementing the above surface hardness. For example, the hard coating layer 100 may include or be formed of polyurethane terephthalate, an acryl-based polymer, a urethane acrylate-based monomer, a urethane acrylate-based oligomer, etc.

The acrylate polymer may include a polymer of (meth)acrylate-based monomers. The (meth)acrylate-based monomer may include an unsaturated group such as a (meth) acryloyl group, a vinyl group, a styryl group, an allyl group, etc., in a molecule as a photo-curable functional group. Preferably, the (meth)acrylate-based monomer may include the (meth)acryloyl group as the photo-curable functional group.

Examples of the monomer having the (meth)acryloyl group may include neopentyl glycol acrylate, 1,6-hexandiol (meth)acrylate, propylene glycol di(meth) acrylate, triethylene glycol di(meth)acrylate, dipropylene glycol di(meth) acrylate, polyethylene glycol di(meth)acrylate, polypropylene glycol di(meth)acrylate, trimethylol propane tri(meth) acrylate, trimethylol ethane tri(meth)acrylate, 1,2,4-cyclohexane tetra(meth)acrylate, penta glycerol tri(meth) acrylate, pentaerythritol tetra(meth)acrylate, pentaerythritol tri(meth)acrylate, dipentaerythritol tri(meth)acrylate, dipentaerythritol penta(meth)acrylate, dipentaerythritol tetra(meth)acrylate, dipentaerythritol hexa(meth)acrylate, tripentaerythritol tri(meth)acrylate, tripentaerythritol hexa tri (meth)acrylate, bis(2-hydroxyethyl)isocyanurate di(meth) acrylate, hydroxyethyl (meth)acrylate, hydroxypropyl (meth)acrylate, hydroxybutyl (meth)acrylate, isooctyl (meth) acrylate, iso-decyl (meth)acrylate, stearyl (meth) acrylate, tetrahydro furfuryl(meth)acrylate, phenoxyethyl (meth)acrylate, isoborneol (meth)acrylate, etc. These may be used alone or in a mixture thereof.

The urethane acrylate-based oligomer may be prepared from, e.g., an isocyanate compound, a polyol compound and an acrylate-based monomer.

Non-limiting examples of the isocyanate compound may include, e.g., 4,4'-diphenylmethane diisocyanate (MDI), 2,6-toluene diisocyante (TDI), 2,4-toluene diisocyanate (TDI), tetramethyl-1,3-xylene diisocyanate (TMXDI), etc.

Non-limiting examples of the polyol compound may include, e.g., a bisphenol-based compound such as Bisphenol A, Bisphenol F, methylene bis(4-hydroxyphenyl), etc., or an aromatic polyol compound such as resorcinol, dihydroxy naphthalene, dihydroxy biphenyl, dihydroxy phenylethanol, dihydroxy pyridine, dihydroxy quinazoline, dihydroxy tetrahydronaphthalene, dihydroxy pyrimidine, etc.

An aliphatic polyol compound may be also used. Non-limiting examples of the aliphatic polyol compound may include a C2-C12 alkylene diol such as 1,3-propanediol, 1,4-butanediol, 1,5-pentanediol, 1,6-hexanediol, 3-methyl-1,5-pentanediol, 1,8-octanediol, 2-methyl-1,8-octane diol, 1,9-nonane diol, 1,10-decane diol, 1,4-cyclohexane dimethanol, 1,3-cyclohexane dimethanol, 1,4-cyclohexane diol, 1,3-cyclohexane diol, tricyclohexane dimethanol, pentacyclopentadecane dimethanol, 1,12-dodecane diol; a polyether diol such as polyethylene glycol, polypropylene glycol, polytetramethylene glycol, polybutylene glycol, polyhexamethylene glycol, polyheptamethylene glycol, polydecamethylene glycol, etc.

A thickness of the hard coating layer 100 may not be specifically limited. For example, the thickness of the hard coating layer 100 may be in a range from about 1 μm to about 30 μm, preferably from about 7 μm to about 30 μm. Within the above range, the window deco film may become thinner and lighter while obtaining the improved hardness.

In example embodiments, the window deco film may include the deco film 300 and the light-shielding layer 400 for implementing a decoration effect.

The deco layer 300 may be configured to control transmittance or reflectivity, and a desired color may be demonstrated by the deco film 300.

The deco layer 300 may be formed by a deposition process. The deco layer 300 may be formed of a metal such as indium, chromium, tin, etc. These may be used alone or in a combination thereof.

For example, a thickness of the deco layer 300 may be about 1 μm or less, preferably, in a range from about 100 nm to about 1 μm. Within the above range, an aesthetic property of the window deco film may be improved in a small thickness.

The light-shielding layer 400 may be formed of a material having a light-shielding color so that, e.g., a lower portion of the deco layer 300 may not be visually observed.

The light-shielding layer may be, e.g., a printed layer such as a screen printed layer.

For example, a thickness of the light-shielding layer 400 may be in a range from about 5 μm to about 30 μm, preferably, in a range from about 15 μm to about 30 μm. Within the above range, the thickness of the deco layer 300 may be decreased so that the window deco film may become thinner and lighter.

In example embodiments, the deco layer 300 and the light-shielding layer 400 may be sequentially formed from the hard coating layer. For example, the deco layer 300 and the light-shielding layer 400 may be sequentially stacked from a viewer side.

In example embodiments, the window deco film may further include a hairline layer 200 for facilitating a deco effect.

The hairline layer 200 may be designed as any pattern. An incident light to the hairline layer 200 may be diffused so that a light having a specific frequency may reach a view's eye to demonstrate a specific color. For example, a metallic texture may be provided by the hairline layer 200 together with the color.

For example, the hairline layer 200 may be formed as a pattern by coating a UV-curable resin and curing the same.

The UV-curable resin may be formed from at least one oligomer selected from, e.g., urethane acrylate, polyester acrylate or epoxy acrylate, and/or at least one monomer selected from, e.g., ethylhexyl acrylate, hydroxyalkyl acrylate, carboxylethyl acrylate, isobornyl acrylate, tetrahydrofurfuryl acrylate, acryloyl morpholine, butanediol diacrylate, hexanediol diacrylate, hexanediol dimethacrylate, ethylene glycol diacrylate, diethylene glycol diacrylate, triethylene glycol diacrylate, trimethylol propane triacrylate, pentaerythritol triacrylate or glyceryl propoxylated triacrylate.

For example, a thickness of the hairline layer 200 may be in a range from about 1 μm to about 20 μm, preferably, in a range from about 5 μm to about 20 μm. Within the above range, an aesthetic property of the window deco film may be improved in a small thickness.

In example embodiments, the hairline layer 200, the deco layer 300 and the light-shielding layer 400 may be sequentially stacked based on a viewer side.

As described above, a substrate film used in a conventional window deco film is normally in a range from about 50 μm to about 100 μm. However, according to example embodiments of the present inventive concepts, the hard coating layer 100 having a significantly reduced thickness may replace the substrate film. In example embodiments, a hardness of the window deco film which may be reduced due to an omission of the substrate film may be improved or compensated by the acryl based coating layer 500.

The acryl-based coating layer 500 may provide a resistance with respect to a pressure, a heat, etc., which may be imposed when the window deco film may be attached to a touch panel. For example, the pressure may be about 5 kgf, and the temperature may be about 50° C.

An acryl-based resin may be used for forming the acryl-based coating layer 500 without a particular limitation. For example, the acryl-based coating layer may be formed from an urethane acrylate-based oligomer, a (meth)acrylate-based monomer, etc.

The urethane acrylate-based oligomer may include the compounds as described above.

The (meth)acrylate-based monomer may include an unsaturated group such as a (meth)acryloyl group, a vinyl group, a styryl group, an allyl group, etc., in a molecule as a photo-curable functional group. Preferably, the (meth)acrylate-based monomer may include the (meth)acryloyl group as the photo-curable functional group.

Examples of the monomer having the (meth)acryloyl group may include neopentyl glycol acrylate, 1,6-hexandiol (meth)acrylate, propylene glycol di(meth) acrylate, triethylene glycol di(meth)acrylate, dipropylene glycol di(meth) acrylate, polyethylene glycol di(meth)acrylate, polypropylene glycol di(meth)acrylate, trimethylol propane tri(meth)acrylate, trimethylol ethane tri(meth)acrylate, 1,2,4-cyclohexane tetra(meth)acrylate, pentaglycerol tri(meth) acrylate, pentaerythritol tetra(meth)acrylate, pentaerythritol tri(meth)acrylate, dipentaerythritol tri(meth)acrylate, dipentaerythritol penta(meth)acrylate, dipentaerythritol tetra(meth)acrylate, dipentaerythritol hexa(meth)acrylate, tripentaerythritol tri(meth)acrylate, tripentaerythritol hexatri (meth)acrylate, bis(2-hydroxyethy)isocyanurate di(meth) acrylate, hydroxyethyl (meth)acrylate, hydroxypropyl (meth)acrylate, hydroxybutyl (meth)acrylate, isooctyl (meth)acrylate, iso-decyl (meth)acrylate, stearyl (meth) acrylate, tetrahydro furfuryl(meth)acrylate, phenoxyethyl (meth)acrylate, isoborneol (meth)acrylate, etc. These may be used alone or in a mixture thereof.

For example, a thickness of the acryl-based coating 500 may be in a range from about 1 μm to about 50 μm, preferably, in a range from about 5 μm to about 20 μm. Within the above range, the window deco film may become thinner and lighter while obtaining improved hardness and durability.

The window deco film according to the present inventive concepts may be attached to a window substrate that may include a display region and a non-display region surrounding the display region.

The display region and the non-display region of the window substrate may correspond to a display region and a non-display region of a display device, respectively.

In the window deco film, the hard coating layer 100 may be disposed at the display region and the non-display region so that the window deco film may entirely enhanced hardness. The hairline layer 200, the deco layer 300, the light-shielding layer 400 and the acryl-based coating layer 500 may be disposed at the non-display region.

For example, the hard coating layer 100, the hairline layer 200, the deco layer 300, the light-shielding layer 400 and the acryl-based coating layer 500 may be sequentially stacked from the viewer side. Alternatively, the hard coating layer 100, the acryl-based coating layer 500, the hairline layer 200, the deco layer 300 and the light-shielding layer 400 may be sequentially stacked from the viewer side.

Referring to FIG. 2, the window deco film may further include a first adhesive layer 600 through which the window deco film may be attached to the window substrate.

The first adhesive layer 600 may be disposed on a top surface of the hard coating layer 100.

The first adhesive layer may include an optical clearance adhesive (OCA), a photo-curable adhesive or a thermally curable adhesive.

For example, a thickness of the first adhesive layer 600 may be in a range from about 5 μm to about 30 μm, preferably, in a range from about 10 μm to about 25 μm. Within the above range, the window deco film may become thinner while obtaining sufficient adhesion and durability.

In some embodiments, a touch panel may be attached toward a lower portion of the window deco film. In this case, the widow deco film may further include a second adhesive layer 700 for an attachment of the touch panel.

If the hairline layer 200, the deco layer 300, the light-shielding layer 400 and the acryl-based coating layer 500 are disposed at the non-display region, a step portion may be created at the lower portion of the window deco film. As illustrated in FIG. 2, the second adhesive layer 700 may be formed on a bottom surface of the hard coating layer 100 to cover or remove the step portion.

The window deco film may further include the touch panel (not illustrated) attached to the second adhesive layer 700.

According to example embodiments of the present inventive concepts, a window including the window deco film may be provided.

The window may include a window substrate and the window deco film attached thereto.

The window substrate may be formed of at least one from glass, polyethersulphone (PES), polyacrylate (PAR), polyetherimide (PEI), polyethyelenen napthalate (PEN), polyethyelene terephthalate (PET), polyphenylene sulfide (PPS), polyallylate, polyimide, polycarbonate (PC), cellulose triacetate (TAC) or cellulose acetate propionate (CAP). The window substrate may include, preferably, a glass substrate.

According to example embodiments of the present inventive concepts, an image display device including the window substrate may be provided.

The window substrate may be applied to, e.g., a liquid crystal display device, a electroluminescent display device, a plasma display device, a field emission display device, etc.

According to example embodiments of the present inventive concepts, a method of fabricating the window deco film may be provided.

Figure 3:
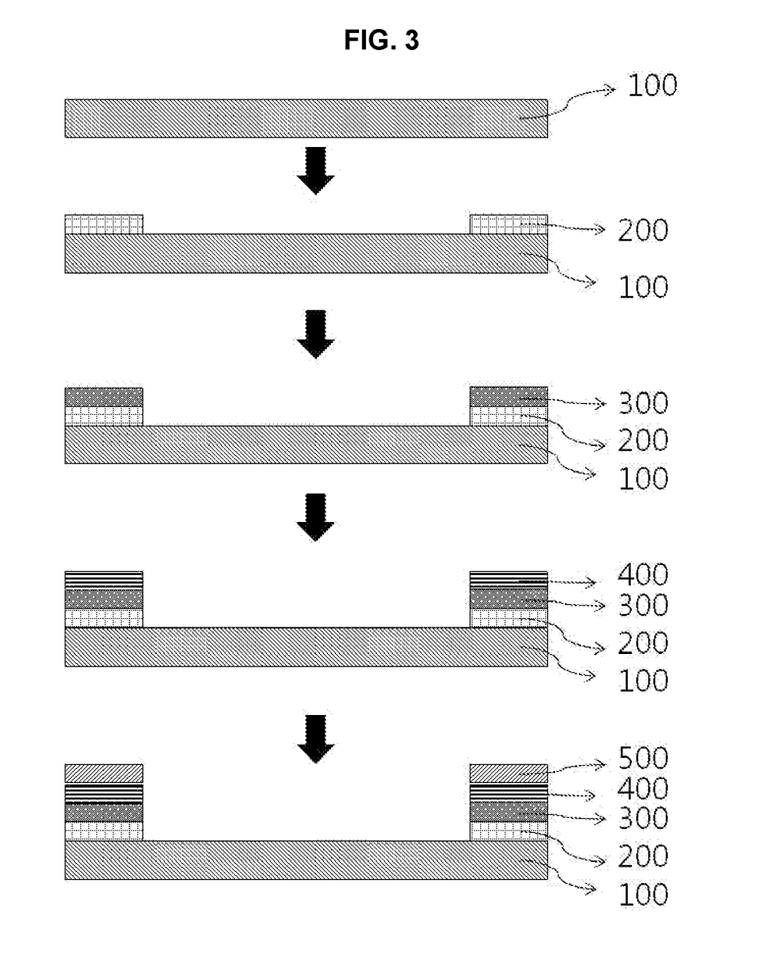
FIGS. 3 and 4 are schematic cross-sectional views illustrating methods of fabricating window deco films in accordance with example embodiments of the present inventive concepts.
Figure 4:
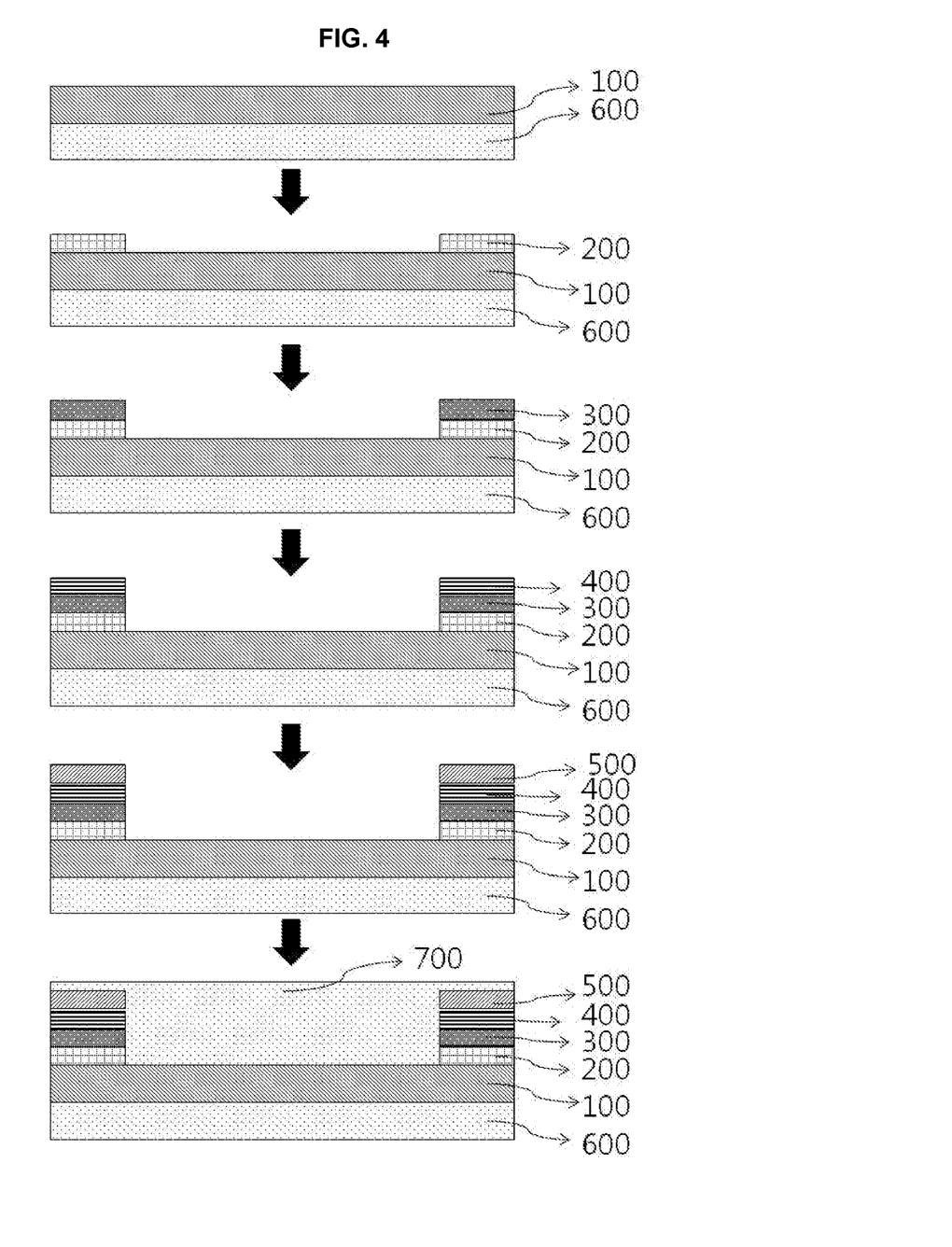

FIGS. 3 and 4 are schematic cross-sectional views illustrating methods of fabricating window deco films in accordance with example embodiments of the present inventive concepts.

Referring to FIG. 3, the hard coating layer 100 may be formed. The hard coating layer 100 may be formed by coating a hard coating layer composition and curing the same.

The hard coating layer composition may be coated by a slit coating, a knife coating, a spin coating, a casting, a micro gravure coating, a gravure coating, a bar coating, a roll coating, a wire-bar coating, a dip coating, a spray coating, a screen printing, a gravure printing, a flexo printing, an offset printing, an ink-jet coating, a dispenser printing, a nozzle coating, a capillary coating, or the like.

A surface hardness of the hard coating layer 100 may be at least 2H, and the hard coating layer composition may include, e.g., polyurethane terephthalate, an acryl-based polymer, an urethane acrylate-based monomer, an urethane acrylate-based oligomer, etc., as mentioned above.

The hard coating layer composition may further include an additive such as an initiator, a silane coupling agent, etc.

The initiator may include a photo-radical initiator such as benzoin, benzoin methyl ether, benzoin ethyl ether, benzoin isopropyl ether, benzoin-n-butyl ether, benzoin isobutyl ether, acetophenone, hydroxyl dimethyl acetophenone, dimethylamino acetophenone, dimethoxy-2-phenyl acetophenone, 3-methyl acetophenone, 2,2-dimethoxy-2-phenyl acetophenone, 2,2-diethoxy-2-phenyl acetophenone, 4-chlorolocetophenone, 4,4-dimethoxyacetophenone, 2-hydroxy-2-methyl-1-phenylpropan-1-one, 4-hydroxy cyclophenyl ketone, 1-hydroxyl cyclohexyl phenyl ketone, 2-methyl-1-[4-(methylthio) phenyl]-2-morpholino-propan-1-one, 4-(2-hydroxyethoxy) phenyl-2-(hydroxy-2-propyl) ketone, benzophenone, p-phenylbenzophenone, 4,4-diamino benzophenone, 4,4'-diethyl aminobenzophenone, dichlorobenzophenone, anthraquinone, 2-methyl anthraquinone, 2-ethyl anthraquinone, 2-t-butyl anthraquinone, 2-amino anthraquinone, 2-methyl thioxanthone, 2-ethyl thioxanthone, 2-chloro thioxanthone, 2,4-dimethyl thioxanthone, 2,4-diethyl thioxanthone, benzyl dimethyl ketal, diphenyl ketone benzyldimethyl ketal, acetophenone dimethyl ketal, p-dimethyl amino benzoic acid ester, 2,4,6-trimethylbenzoyl-diphenyl-phosphine oxide, fluorene, triphenylamine, carbazole, etc. These may be used alone or in a combination thereof.

The initiator may include a thermal polymerization initiator such as hydrogen peroxide; peroxodisulfate such as ammonium peroxodisulfate, sodium peroxodisulfate or potassium peroxodisulfate; an azo compound such as 2,2'-azobis (2-amidinopropane) dichloride, 4,4'-azobis (4-cyanovaleric acid), 2,2'-azobis isobutyronitrile, 2,2'-azobis (4-methoxy-2,4-dimethylvaleronitrile); an organic peroxide such as benzoyl peroxide, lauroyl peroxide, peracetic acid, persuccinic acid, di-t-butyl peroxide, t-butyl hydroperoxide, cumene hydroperoxide, etc. These may be used alone or in a combination thereof.

For example, the hard coating layer composition may include polyurethane terephthalate in a range from about 90 wt % to about 95 wt %, the acryl-based polymer in a range from about 0.5 wt % to about 6 wt %, the urethane acrylate-based monomer and oligomer in a range from about 0.5 to about 5 wt %, and the initiator in a range from about 0.5 to about 5 wt %, based on a total weight of the composition.

The hard coating layer composition may be cured by a photo-curing process or a thermal curing process (e.g., at about 60° C.) to have a thickness as mentioned above.

Subsequently, the deco layer 300 may be formed on the hard coating layer 100. In some embodiments, the hairline layer 200 may be formed on the hard coating layer 100 before forming the deco layer 300.

For example, the deco layer 300 may be formed by depositing a metal as described above on the hairline layer 200 to have the above-mentioned thickness.

In some embodiments, the deco layer 300 may be formed directly on the hard coating layer 100.

For example, the hairline layer 200 may be formed by coating a UV-curable composition on the hard coating layer 100 as a pattern shape and curing the same.

The hairline 200 may be formed to have the thickness as described above.

Subsequently, the light-shielding layer 400 may be formed on the deco layer 300.

The light-shielding layer 400 may be formed by, e.g., by a slit coating, a knife coating, a spin coating, a casting, a micro gravure coating, a gravure coating, a bar coating, a roll coating, a wire-bar coating, a dip coating, a spray coating, a screen printing, a gravure printing, a flexo printing, an offset printing, an ink-jet coating, a dispenser printing, a nozzle coating, a capillary coating, or the like. In an implementation, the light-shielding layer 400 may be formed by the screen printing.

The light-shielding layer 400 may be formed to have the above-mentioned thickness.

In example embodiments, the acryl-based coating layer 500 may be further formed.

As illustrated in FIG. 3, the acryl-based coating layer 500 may be formed on the light-shielding layer 400 after forming the light-shielding layer 400. However, the acryl-based coating layer 500 may be formed on the hard coating layer 100 before forming the hairline layer 200. In this case, the hairline layer 200 may be formed on the acryl-based coating layer 500.

The acryl-based coating layer 500 may be formed by coating an acryl-based coating composition and curing the same.

The acryl-based coating composition may include, e.g., an urethane acrylate-based oligomer, a (meth)acrylate-based monomer, etc., and may further include an additive such as an initiator, a coupling agent, etc., as described above.

For example, the acryl-based coating composition may include the urethane acrylate-based oligomer in a range from about 30 wt % to about 60 wt %, the acrylate-based monomer in a range from about 30 wt % to about 60 wt %, and the initiator in a range from about 1 wt % to about 5 wt %, based on a total weight of the composition. In an implementation, the acryl-based coating composition may include the urethane acrylate-based oligomer in a range from about 35 wt % to about 55 wt %, the acrylate-based monomer in a range from about 35 wt % to about 55 wt %, and the initiator in a range from about 1 wt % to about 5 wt %

The acryl-based coating composition may be cured by, e.g., a photo-curing process or a thermal curing process well known in the related art.

For example, the acryl-based coating composition may be cured by the photo-curing process using UVB.

Referring to FIG. 4, the first adhesive layer 600 may be formed on the hard coating layer 100 for combining a window substrate. For example, the hard coating layer 100 may be formed on a surface of the first adhesive layer 600 for a process convenience.

In some embodiments, the first adhesive layer 600 may be formed on one surface of the hard coating layer 100, and the hairline layer 200, the deco layer 300, the light-shielding layer 400 and the acryl-based coating layer 500 may be formed on an opposite surface facing the one surface of the hard coating layer 100.

The first adhesive layer 600 may be formed of an OCA, or may be formed as a photo-curable or thermally curable adhesive layer.

For example, the first adhesive layer 600 may be formed to have the thickness as described above.

In example embodiments, the hard coating layer 100 may be formed throughout the display region and the non-display region so that the entire window deco film may have improved hardness. The hairline layer 200, the deco layer 300, the light-shielding layer 400 and the acryl-based coating layer 500 may be formed at the non-display region, As illustrated in FIG. 4, the second adhesive layer 700 may be further formed so that a touch panel may be attached to a lower portion of the window deco film.

The second adhesive layer 700 may be formed on a surface of the hard coating layer 100 which may be opposite to a surface of the hard coating layer 100 on which the first adhesive layer 600 is formed.

A step portion generated by the deco layer 300, the acryl-based coating layer 500, or the like, may be reduced or removed by the second adhesive layer 700 formed on the hard coating layer 100.

According to example embodiments of the present inventive concepts, a method of fabricating a window is provided.

In the method, the window deco film may be prepared as described above, and then a window substrate may be attached to a surface of the first adhesive layer 600.

The window substrate may be formed of at least one from glass, polyethersulphone (PES), polyacrylate (PAR), polyetherimide (PEI), polyethyelenen napthalate (PEN), polyethyelene terephthalate (PET), polyphenylene sulfide (PPS), polyallylate, polyimide, polycarbonate (PC), cellulose triacetate (TAC) or cellulose acetate propionate (CAP).

Additionally, a touch panel may be attached to the second adhesive layer 700.

Hereinafter, exemplary embodiments are proposed to more concretely describe the present invention. However, the following examples are only given for illustrating the present invention and those skilled in the art will obviously understand that various alterations and modifications are possible within the scope and spirit of the present invention. Such alterations and modifications are duly included in the appended claims.

Example 1

A hard coating composition including polyurethane terephthalate was coated on an OCA layer (a first adhesive layer) having a thickness of 7 μm and thermally cured to form a hard coating layer having a thickness of 7 μm. A hairline layer having a thickness of 15 μm was formed on a region corresponding to a non-display region of the hard coating layer. A metal including indium, chrome, tin, etc., was deposited on the hairline layer to form a deco layer having a thickness of 1 μm. A light-shielding layer having a thickness of 15 μm was formed on the deco layer by a screen printing, and then an acryl-based coating layer having a thickness of 15 μm was formed on the light-shielding layer using a urethane acrylate oligomer composition. Subsequently, an OCA layer (a second adhesive layer) having a thickness of 100 μm was attached to the hard coating layer to cover a step portion between the hard coating layer and the acryl-based coating layer.

Example 2

Processes the same as those of Example 1 were performed except that the acryl-based coating layer was formed on the hard coating layer before forming the hairline layer.

Comparative Example 1

An OCA layer having a thickness of 25 μm and a PET film having a thickness of 50 μm were attached to each other, and then the hairline layer, the deco layer and the light-shielding layer were formed on the PET film as described in Example 1. Subsequently, an OCA layer having the same thickness was attached to the PET film.

Comparative Example 2

Processes the same as those of Example 1 were performed except that the acryl-based coating layer was omitted.

Experimental Example

1. Measuring Thickness
Thicknesses of the window deco films according to Examples and Comparative Examples except for the OCA layers were measured.
2. Evaluation of Bubble Generation
A bubble generation was visually inspected while the window deco films of Examples and Comparative Examples were attached to a window substrate (a glass having a thickness of 0.4 t) under a three wavelength lamp.
3. Evaluation of Mura Generation
A mura generation was visually inspected while the window deco films of Examples and Comparative Examples were attached to a window substrate (a glass having a thickness of 0.4 t) under a three wavelength lamp.
4. Evaluation of Crack Generation from Pressure
If a hardness of the acryl-based coating layer is insufficient, crack or dentation of the deco layer may be caused in a step portion when a lower substrate is combined. In this respect, a substrate was combined to a lower portion of the second adhesive layer included in the window deco film of each Example and Comparative Example by a pressure of 5 kgf, and the crack generation was observed after an autoclaving.
The results from the Experimental Example were listed in Table 1 below.

TABLE 1

| | Thickness (μm) | Bubble Generation | Mura Generation | Crack Generation |
|---|---|---|---|---|
| Example 1 | 53 | X | X | X |
| Example 2 | 53 | X | X | X |
| Comparative | 81 | ○ | ○ | X |

TABLE 1-continued

| | Thickness (μm) | Bubble Generation | Mura Generation | Crack Generation |
|---|---|---|---|---|
| Example 1 | | | | |
| Comparative Example 2 | 38 | X | X | ○ |

Referring to Table 1, the window deco films according to Examples had thicknesses smaller than those of the window deco films according to Comparative Examples, and bubbles were not caused in the window deco films according to Examples while being attached to the window substrate. Further, the window deco films according to Examples did not include PET base films, and thus had substantially zero retardation to be free of the mura.

However, the mura and bubbles were caused in the window deco films according to Comparative Examples, and did not include the acryl-based coating layer to result in cracks when being attached to the lower substrate.

What is claimed is:

1. A window deco film, comprising:
   a hard coating layer including a display region and a non-display region around the display region; and
   a deco layer, a light-shielding layer and an acryl-based coating layer formed on the hard coating layer,
   wherein the deco layer, the light-shielding layer and the acryl-based coating layer are sequentially stacked in this order from a lower surface of the hard coating layer, and are formed only on a portion of the hard coating layer in the non-display region such that a portion of the lower surface of the hard coating layer in the display region is exposed; and
   the window deco film is a substrate-less film.

2. The window deco film according to claim 1, further comprising a hairline layer on the hard coating layer.

3. The window deco film according to claim 2, wherein the hairline layer, the deco layer and the light-shielding layer are sequentially stacked in this order from the lower surface of the hard coating layer.

4. The window deco film according to claim 1, further comprising a first adhesive layer formed on an upper surface of the hard coating layer, wherein the deco layer, the light-shielding layer and the acryl-based coating layer are stacked on an opposite surface of the hard coating layer with respect to the one surface of the hard coating layer.

5. The window deco film according to claim 4, further comprising a window substrate attached to the hard coating layer through the first adhesive layer, the window substrate including a display region and a non-display region around the display region.

6. The window deco film according to claim 1, further comprising a second adhesive layer,
   wherein the deco layer, the light-shielding layer and the acryl-based coating layer form a stacked structure, and the second adhesive layer is formed on the lower surface of the hard coating layer and covers the stacked structure.

7. The window deco film of claim 6, further comprising a touch panel attached to the second adhesive layer.

8. A window comprising the window deco film of claim 1.

9. An image display device comprising the window of claim 8.

* * * * *